A. Deutschel,
Ice Cutter.
No 105,183. Patented July 12. 1870.

Inventor.
A. Deutschel.
p. Burridge & Co
Attorneys.

Witnesses:
L. H. Burridge.
D. L. Humphrey

UNITED STATES PATENT OFFICE.

ABRAHAM DEUTSCHEL, OF CLEVELAND, OHIO.

IMPROVEMENT IN ICE-CUTTING MACHINES.

Specification forming part of Letters Patent No. 105,183, dated July 12, 1870.

*To all whom it may concern:*

Be it known that I, ABRAHAM DEUTSCHEL, of Cleveland, in the county of Cuyahoga and State of Ohio, have invented certain new and useful Improvements in Ice-Cutters, of which the following is a specification.

Figure 1:
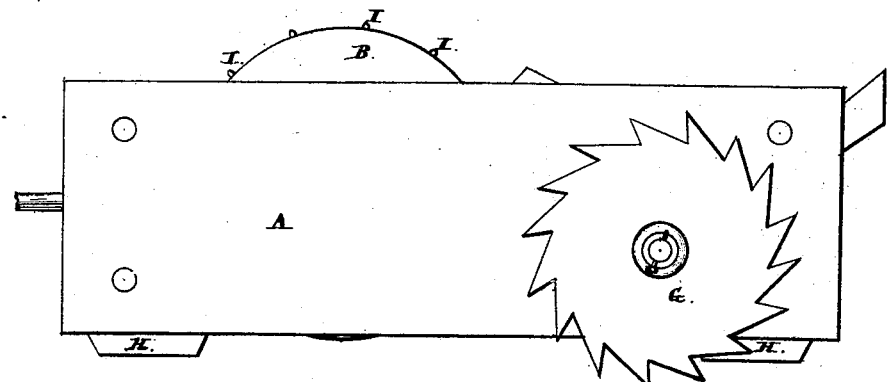
Figure 2:
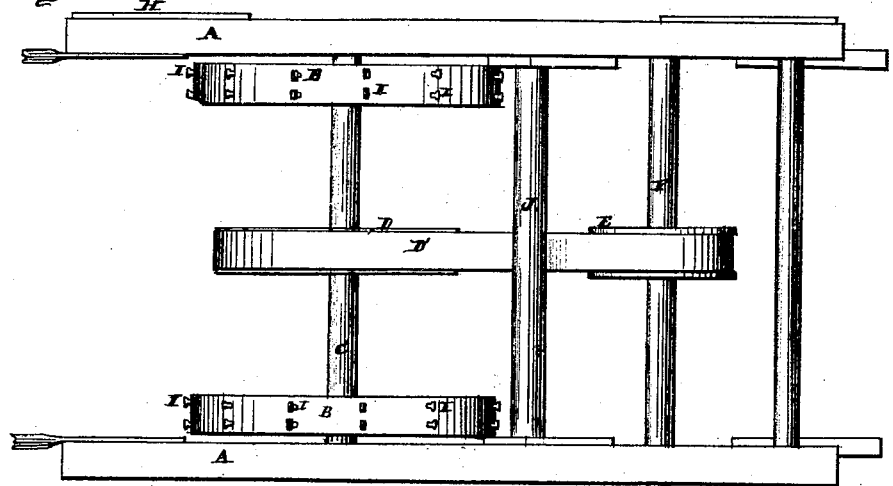
Figure 3:
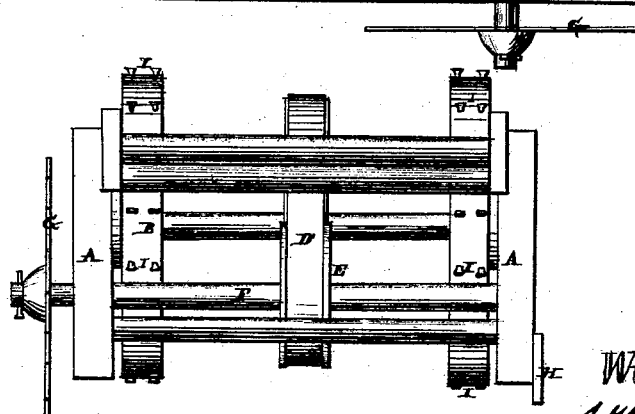

In the drawings, Figure 1 is a side view of the machine; Fig. 2, a view of the top; Fig. 3, an end view.

Like letters of reference refer to like parts in the different views.

This invention has for its object the cutting of ice for storage, the cutting being done by a circular saw hung to the side of a frame. In said frame are arranged the pulleys and wheels whereby the saw is operated, as hereinafter described.

In the drawings, Fig. 1, A represents an oblong square frame, in which is journaled a pair of driving-wheels, B, secured in a permanent manner to the shaft C. On said shaft is also secured a pulley, D, Fig. 2, from which runs a belt, D', to a pulley, E, mounted upon the shaft F, having its bearings in the sides of the frame.

On the outer end of the shaft F is secured a circular saw, G, the shaft of which is so arranged in the frame that it can be adjusted upward or downward in its relation to the frame, for a purpose hereinafter shown.

To each of the lower corners of one side of the frame is attached a guide or shoe, H, whereby the apparatus is guided in the course of its work, as presently shown.

Operation: The operation of this machine is as follows: A team is hitched to the front end by any appropriate means, and thereby drawn forward in the line of work. As the machine progresses, the wheels B revolve by means of the spurs I, penetrating the ice and preventing them from slipping. The rotation of the wheels operates the saw, which, being below the edge of the frame, cuts down into the ice. A first cut having been made, a second one is cut parallel therewith by a return of the machine, and which is guided in its return by the guides or shoes H, which are allowed to run in the kerf made by the saw, and so on for each subsequent cut made. The guides run in the preceding kerf, thereby sawing the ice in straight and parallel lines, which are then cut into blocks of regular size by a transverse direction given to the movement of the machine. The ice is not entirely cut through, some few inches of its thickness being left uncut for the support of the operators for removing the blocks of ice, which are easily detached by prying them off with levers or gads. The cut of the saw may be more or less in depth, according to the thickness of the ice, always leaving below a few inches uncut for this purpose. The saw can be adjusted below the bottom of the frame as the depth necessary to be cut may require, the entire depth being cut at once, thus avoiding all recutting which the ice-cutters in ordinary use must do in order to cut sufficiently deep so that the blocks can be broken off.

J is a tension-roller whereby the belt D is kept taut, and thus the more efficiently carry the saw.

What I claim as my improvement, and desire to secure by Letters Patent, is—

The herein-described ice-cutter, consisting of the saw G, pulleys E D, driving-wheels B, guides H, and frame A, when combined and arranged to operate in the manner substantially as described, and for the purpose specified.

ABRAHAM DEUTSCHEL.

Witnesses:
J. H. BURRIDGE,
D. L. HUMPHREY.